(12) United States Patent
Liu et al.

(10) Patent No.: US 11,691,266 B2
(45) Date of Patent: Jul. 4, 2023

(54) MOUNTING BRACKET AND SELF-PROPELLED ROBOT

(71) Applicant: Beijing Roborock Technology Co., Ltd., Beijing (CN)

(72) Inventors: Xiaoyu Liu, Beijing (CN); Shuai Zhi, Beijing (CN); Zhichun Zhang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 0 days.

(21) Appl. No.: 18/050,528

(22) Filed: Oct. 28, 2022

(65) Prior Publication Data
US 2023/0075678 A1 Mar. 9, 2023

Related U.S. Application Data

(63) Continuation of application No. PCT/CN2021/087779, filed on Apr. 16, 2021.

(30) Foreign Application Priority Data

Jun. 16, 2020 (CN) .......................... 202010547861.7

(51) Int. Cl.
*B25J 9/00* (2006.01)
*B25J 19/02* (2006.01)
(Continued)

(52) U.S. Cl.
CPC ......... *B25J 9/0009* (2013.01); *B25J 11/0085* (2013.01); *B25J 19/022* (2013.01); *F16B 1/00* (2013.01); *F16B 2001/0035* (2013.01)

(58) Field of Classification Search
CPC combination set(s) only.
See application file for complete search history.

(56) References Cited

U.S. PATENT DOCUMENTS 7,152,267 B2 12/2006 Kaleta
10,260,873 B2 4/2019 Faix et al.
(Continued)

FOREIGN PATENT DOCUMENTS

CN 105716647 A 6/2016
CN 205521503 U 8/2016
(Continued)

OTHER PUBLICATIONS

International Search Report for PCT/CN2021/087779, dated Jul. 16, 2021.
(Continued)

*Primary Examiner* — Monica E Millner
(74) *Attorney, Agent, or Firm* — Thomas Horstemeyer, LLP

(57) ABSTRACT

Embodiments of the present disclosure disclose a mounting bracket and a self-propelled robot. The mounting bracket includes a housing, a rotating shaft and a magnetic positioning assembly. The housing is provided with an inner cavity. The rotating shaft is configured to rotate about an axis in the inner cavity. The magnetic positioning assembly includes a first magnetic element and a second magnetic element which are respectively arranged on the housing and the rotating shaft. The laser distance sensor is attached to the rotating shaft and configured to rotate about the axis. The mounting bracket is configured to prevent the rotating shaft from deviating from the axis by generating a force between the first magnetic element and the second magnetic element in a radial direction of the rotating shaft.

20 Claims, 2 Drawing Sheets

(51) Int. Cl.
  *F16B 1/00*  (2006.01)
  *B25J 11/00*  (2006.01)

(56) References Cited

U.S. PATENT DOCUMENTS

| | | | |
|---|---|---|---|
| 10,289,111 B1* | 5/2019 | Romano | G05D 1/0022 |
| 10,555,457 B2* | 2/2020 | Song | A01D 34/828 |
| 11,446,718 B2* | 9/2022 | Ayres | B08B 3/08 |
| 11,565,417 B2* | 1/2023 | Bryner | G01J 3/50 |
| 2004/0034952 A1 | 2/2004 | Ho et al. | |
| 2016/0230535 A1* | 8/2016 | Sobolewski | F16M 13/02 |
| 2020/0114529 A1* | 4/2020 | Meeker | B25J 9/0009 |
| 2020/0206895 A1* | 7/2020 | Jung | B25J 9/0009 |

FOREIGN PATENT DOCUMENTS

| | | |
|---|---|---|
| CN | 111568301 A | 8/2020 |
| CN | 212729668 U | 3/2021 |

OTHER PUBLICATIONS

International Written Opinion by ISA/CN for PCT/CN2021/087779, dated Jul. 16, 2021.

\* cited by examiner

MOUNTING BRACKET AND SELF-PROPELLED ROBOT

CROSS REFERENCE TO RELATED APPLICATIONS

The present disclosure is a Continuation Application of PCT Application No. PCT/CN2021/087779, filed on Apr. 16, 2021, which is based upon and claims priority to Chinese Patent Application No. 202010547861.7 filed on Jun. 16, 2020, which is incorporated herein by reference in its entirety.

TECHNICAL FIELD

The present disclosure relates to the field of robot technologies, and in particular, to a mounting bracket and a self-propelled robot.

BACKGROUND

With the development of technologies, various robots with intelligent systems, such as a cleaning robot, a mopping robot, a vacuum collector and a lawnmower emerge. These robots can automatically travel in a certain area and carry out cleaning or clearing without operations of users. A robot is usually equipped with a laser distance sensor (LDS), which is configured to measure distances between the robot and various obstacles in an area in which the robot is located, so that the robot creates a map of the area, avoids the obstacles and locates itself in the area.

At present, most of LDSs are rotatably mounted on robots, and distances between the robots and nearby obstacles can be measured by rotating the LDSs.

SUMMARY

A technical problem to be solved in the present disclosure is how to provide a mounting bracket which can alleviate an offset and jitter during rotation of a laser distance sensor.

Another technical problem to be solved in the present disclosure is how to provide a self-propelled robot having the mounting bracket.

Additional aspects and advantages of the present disclosure will be set forth in part in the following descriptions and, in part, will be obvious from the descriptions, or may be learned by practice of the present disclosure.

To achieve the objective, the following technical solutions are adopted in the present disclosure:

An embodiment of the present disclosure provides a mounting bracket, configured to rotatably mount a laser distance sensor on a base body. The mounting bracket includes a housing, a rotating shaft and a magnetic positioning assembly. The housing is provided with an inner cavity. The rotating shaft is configured to rotate about an axis in the inner cavity. The magnetic positioning assembly includes a first magnetic element and a second magnetic element which are respectively arranged on the housing and the rotating shaft. The laser distance sensor is attached to the rotating shaft and configured to rotate about the axis, and the mounting bracket is configured to prevent the rotating shaft from deviating from the axis by generating a force between the first magnetic element and the second magnetic element in a radial direction of the rotating shaft.

An embodiment of the present disclosure provides a self-propelled robot, including a base body and a laser distance sensor. The self-propelled robot further includes the mounting bracket, which is configured to rotatably mount the laser distance sensor on the base body.

BRIEF DESCRIPTION OF DRAWINGS

The following accompanying drawings of the present disclosure are used herein as a part of the present disclosure for understanding the present disclosure. The accompanying drawings illustrate embodiments of the present disclosure and descriptions thereof, which are used to explain the principles of the present disclosure. It should be noted that the figures are not necessarily drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 1:
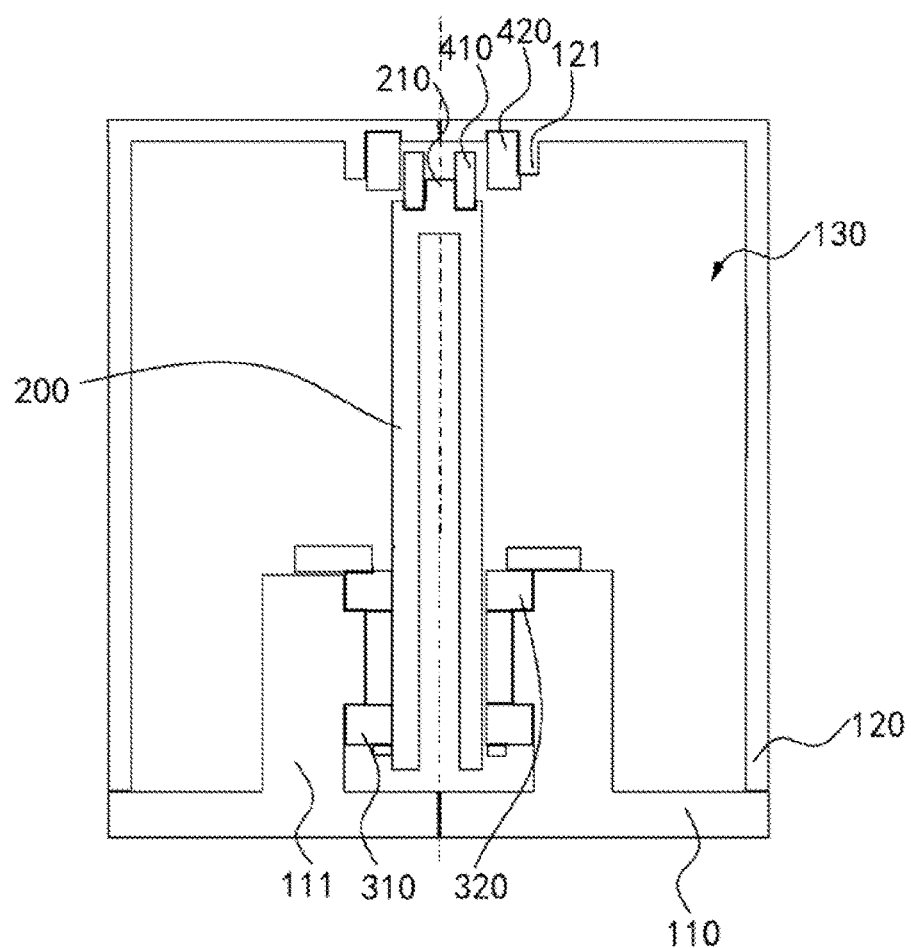
FIG. 1 illustrates a cross-sectional view of a mounting bracket according to an embodiment of the present disclosure.

Reference numerals of the drawings are as follows:
110. first case;
111. shaft seat;
120. second case;
121. first bump;
122. groove;
130. inner cavity;
200. rotating shaft;
210. second bump;
220. platform;
310. first bearing;
320. second bearing;
410. second magnetic element;
420. first magnetic element;
510. second magnetic element; and
520. second magnetic element.

DESCRIPTION OF EMBODIMENTS

Exemplary embodiments of the present invention are described in more detail with reference to the accompanying drawings. However, the exemplary embodiments can be implemented in various forms, and should not be construed as being limited to the embodiments set forth herein; on the contrary, these embodiments are provided so that the present disclosure can be more comprehensive and complete, and fully convey the concept of the exemplary embodiments to a person skilled in the art. Same reference numerals in the accompanying drawings denote same or similar structures, and thus detailed descriptions thereof are omitted.

FIG. 1 schematically illustrates a cross-sectional view of a mounting bracket provided in an embodiment of the present disclosure according to an exemplary embodiment. In the exemplary embodiment, the mounting bracket according to the present disclosure is illustrated through an example in which the mounting bracket is applied to a robot such as a sweeping robot. One of ordinary skill in the art can easily understand that various modifications, addition, replacement, deletion or other changes made to the following specific embodiments for applying related design of the embodiments of the present disclosure to other robots or equipment shall fall within the scope of the principle of the mounting bracket according to the embodiments of the present disclosure.

As illustrated in FIG. 1, in the embodiment of the present, the mounting bracket according to the present disclosure can be configured to rotatably mount a laser distance sensor on a base body (for example, a housing of a sweeping robot). The mounting bracket includes a housing, a rotating shaft 200 and a magnetic positioning assembly. The structure, the connecting way and the functional relationship of main components of the mounting bracket according to the embodiment of the present disclosure are described in detail with reference to FIG. 1.

As illustrated in FIG. 1, in the embodiment, the housing is provided with an inner cavity 130. In the embodiment of the present disclosure, the inner cavity 130 may be a closed space formed by the housing which can be made of a material capable of emitting light through the laser distance sensor. The rotating shaft 200 is vertically arranged and in the inner cavity 130 and is configured to rotate about an axis. The magnetic positioning assembly includes two magnetic elements which are respectively attached to the housing and the rotating shaft 200. For ease of understanding and description, the magnetic element arranged on the rotating shaft 200 is referred to as the second magnetic element 410 and the magnetic element arranged on the housing is referred to as the first magnetic element 420. The laser distance sensor is attached to the rotating shaft 200 and rotates about the axis, the mounting bracket according to the present disclosure may prevent the rotating shaft 200 from deviating from the axis through a magnetic force between the two magnetic elements. Specifically, in a case that the rotating shaft 200 deviates from an axis, the technical solution according to the embodiment of the present disclosure can position the positioning shaft 200 with respect to the housing through a force in a radial direction of the rotating shaft 200 between the first magnetic element 420 and the second magnetic element 410. Through the scheme, the mounting bracket according to the embodiment of the present disclosure can effectively alleviate an offset and jitter generated during rotation of the laser distance sensor, thereby improving reliability and precision of the products, prolonging service lives of the products, and the like. According to the technical solution provided in the embodiment of the present disclosure, the principle of attraction of opposite magnetisms and repellence of identical magnetisms between the second magnetic element and the first magnetic element can be utilized to generate a force in the radial direction of the rotating shaft 200 to position the rotating shaft 200; and moreover, the rotating shaft 200 is not in direct contact with a structure such as a case (for example, a second case 120), further reducing friction between components.

Optionally, as illustrated in FIG. 1, in the embodiment, the housing can include a first case 110 and the second case 120. Specifically, the second case 120 is detachably arranged on the first case 110, and the first case 110 and the second case 120 cooperatively form a housing and defines the inner cavity 130 of the housing. On this basis, a lower end of the rotating shaft 200 is rotatably arranged on the first case 110. In another embodiment, the housing can alternatively have another structure, such as an integrated structure. Furthermore, in a case that the housing includes the first case and the second case, the two housings are not limited to the vertical combination way in the embodiment, for example, can be juxtaposed. In addition, an upper end of the rotating shaft may be rotatably engaged with the housing. This is not limited in the embodiment.

Further, as illustrated in FIG. 1, based on the scheme that a lower end of the rotating shaft 200 is rotatably arranged on the first case 110, in the embodiment, an inner surface of a bottom of the first case 110 can be equipped with a shaft seat 111. On this basis, the lower end of the rotating shaft 200 can be rotatably arranged on the shaft seat 111 through a bearing.

Furthermore, as illustrated in FIG. 1, based on the scheme that the rotating shaft 200 is arranged on the shaft seat 111 through the bearing, in the embodiment, a plurality of bearings can be arranged between the rotating shaft 200 and the shaft seat 111, and the embodiment is described through an example in which there are two bearings. For ease of understanding and description, the two bearings are respectively defined as a first bearing 310 and a second bearing 320 in the specification. The two bearings are arranged between the rotating shaft 200 and the shaft seat 111 at intervals in a vertical direction (namely, an axial direction of the rotating shaft 200), and the second bearing 320 is located above the first bearing 310.

Optionally, as illustrated in FIG. 1, in the embodiment, a shaft cavity which extends along the axis is defined inside the rotating shaft 200.

Optionally, as illustrated in FIG. 1, in the embodiment, the first magnetic element 420 can be symmetrically arranged relative to the axis. For example, in a case that the first magnetic element 420 has a circular-ring-shaped structure, a center of a circle corresponding to the first magnetic element 420 is positioned on the rotating shaft 200 or an extending line thereof. For another example, in a case that the first magnetic element 420 has a regularly-polygonal plate-shaped structure, a geometric center thereof is positioned on the rotating shaft 200 or the extending line thereof. That is, the first magnetic element 420 has a ring-shaped or plate-shaped structure in central symmetry, wherein the central symmetry indicates a symmetrical shape with respect to its geometric center positioned on the rotating shaft 200 or the extending line thereof.

Optionally, as illustrated in FIG. 1, in the embodiment, the second magnetic element 410 may be symmetrically arranged with respect to the axis. For example, in a case that the second magnetic element 410 has a circular-ring-shaped structure, a circle center of a circle corresponding to the second magnetic element is positioned on the rotating shaft 200 or an extending line thereof. For another example, in a case that the second magnetic element 410 has a regularly-polygonal plate-shaped structure, a geometric center thereof is positioned on the rotating shaft 200 or the extending line thereof. That is, the second magnetic element 410 has a ring-shaped or plate-shaped structure in central symmetry, wherein the central symmetry indicates a symmetrical shape with respect to its geometric center positioned on the rotating shaft 200 or the extending line thereof.

Optionally, as illustrated in FIG. 1, in the embodiment, the magnetic positioning assembly is arranged between the housing and the upper end of the rotating shaft 200. Specifically, among the two magnetic elements of the magnetic positioning assembly, the second magnetic element 410 is arranged at the upper end of the rotating shaft 200, and the first magnetic element 420 is arranged on a position, corresponding to the upper end of the rotating shaft 200, of the housing.

Furthermore, as illustrated in FIG. 1, based on the scheme that the magnetic positioning assembly is arranged between the housing and the upper end of the rotating shaft 200, in the embodiment, the second magnetic element 410 and the first magnetic element 420 have annular structures respectively, axes of which coincide with the axis. A polarity of the second magnetic element 410 and a polarity of the first magnetic element 420 are identical, so that magnetic repulsive force is generated between the second magnetic element 410 and the first magnetic element 420. On this basis, an outer diameter of the second magnetic element 410 may be less than an inner diameter of the first magnetic element 420, so that the first magnetic element 420 may be arranged around the second magnetic element 410; and a clearance is formed between the inner ring surface of the first magnetic element 420 and the outer ring surface of the second magnetic element 410. Therefore, in a case that the rotating shaft 200 deviates from the axis, the magnetic repulsive force includes force which is applied to the second magnetic element 410 (indirectly applied to the rotating shaft 200) in the radial direction of the rotating shaft 200 along the axis thereof, thereby positioning the rotating shaft 200 on the axis.

Furthermore, based on the scheme that the second magnetic element 410 has an annular structure, in the embodiment, the second magnetic element 410 may have a circular-ring-shaped structure. In another embodiment, alternatively, the second magnetic element may have a polygonal annular structure or the like. This is not limited in the embodiment.

Furthermore, based on the scheme that the first magnetic element 420 has an annular structure, in the embodiment, the first magnetic element 420 may have a circular-ring-shaped structure. In another embodiment, alternatively, the first magnetic element may have a polygonal annular structure or the like. This is not limited in the embodiment.

Furthermore, as illustrated in FIG. 1, based on the scheme that the magnetic positioning assembly is arranged between the housing and the upper end of the rotating shaft 200 and the scheme that the second magnetic element 410 has an annular structure, in the embodiment, the upper end of the rotating shaft 200 may be provided with a second bump 210 that bumps upwards, and accordingly, the second magnetic element 410 is arranged around the second bump 210.

Furthermore, based on the scheme that the upper end of the rotating shaft 200 is provided with the second bump 210 that bumps upwards and the scheme that the second magnetic element 410 has a circular-ring-shaped structure, in the embodiment, the second bump 210 may be cylindrical, and the second magnetic element 410 is arranged around an outer ring surface of the second bump 210. In addition, a diameter of a circle corresponding to a cross section of the second bump 210 may be equal to or slightly greater than an inner diameter of the second magnetic element 410, so that the second magnetic element 410 is arranged around the second bump 210 in a tight fit or interference fit mode, and the second magnetic element 410 is further prevented from radial wobble and axial jolt in a high-speed rotation of the rotating shaft 200. In another embodiment, in a case that the second magnetic element has a polygonal annular structure, the second bump may also have a corresponding polyprism-shaped structure.

Furthermore, as illustrated in FIG. 1, based on the scheme that the magnetic positioning assembly is arranged between the housing and the upper end of the rotating shaft 200 and the scheme that the first magnetic element 420 has an annular structure, in the embodiment, the lower surface of the top of the housing (for example, the second case 120) can be provided with a first bump 121 that bumps downwards (that is, facing the rotating shaft 200), and accordingly, the first magnetic element 420 is arranged around the first bump 121.

Furthermore, based on the scheme that the lower surface of the top of the housing is provided with a first bump 121 and the scheme that the first magnetic element 420 has a circular-ring-shaped structure, in the embodiment, the first bump 121 may have a shape of a circular ring, and the first magnetic element 420 is arranged around the inner ring surface of the first bump 121. In addition, a diameter of a circle corresponding to the cross section of the first bump 121 may be equal to or slightly less than an inner diameter of the first magnetic element 420, so that the first magnetic element 420 is arranged around the second first structure 121 in a tight fit or interference fit, and the combination degree between the first magnetic element 420 and the housing is further improved. In another embodiment, in a case that the first magnetic element has a polygonal annular structure, the second bump may also have a corresponding polygonal ring-shaped structure.

It should be noted that in another embodiment, based on the scheme that both the second magnetic element and the first magnetic element have ring-shaped structures, the second bump may also have a shape of a circular ring, and the outer ring of the second magnetic element is sleeved by the inner ring surface of the second bump. Alternatively, the first bump is cylindrical, and the inner ring of the first magnetic element is arranged around the outer ring surface of the first bump. This is not limited in the embodiment.

Figure 2:
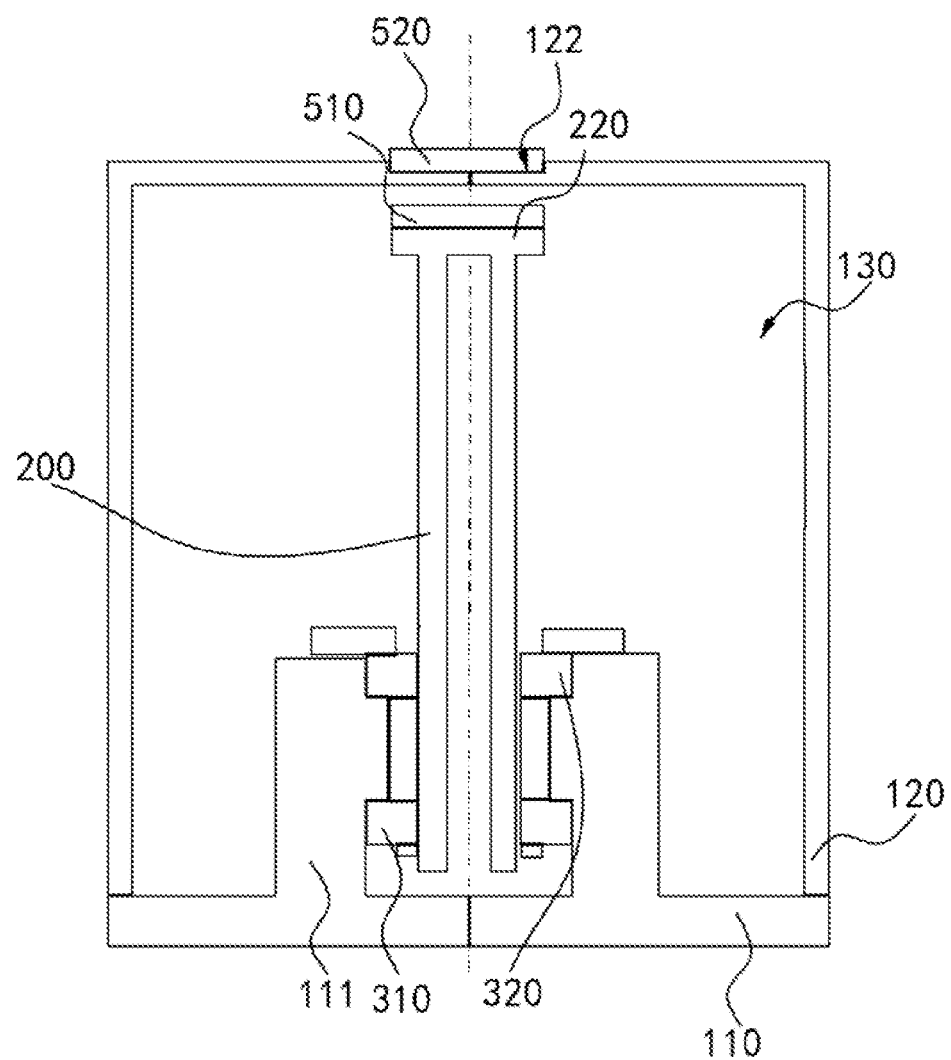
FIG. 2 illustrates a cross-sectional view of a mounting bracket according to another embodiment of the present disclosure.

FIG. 2 schematically illustrates a cross-sectional view a mounting bracket according to another exemplary embodiment of the present disclosure. The structure, the connecting manner and the functional relationship of main components of the mounting bracket according to the exemplary embodiment of the present disclosure are substantially the same as those of the schemes in the first embodiment. The content, different from the first embodiment, in the second embodiment of the mounting bracket provided in the present disclosure is described in detail with reference to the accompanying drawings.

As illustrated in FIG. 2, in the embodiment, a second magnetic element 510 and a first magnetic element 520 have plate-shaped structures, and a polarity of the second magnetic element 510 and a polarity of the first magnetic element 520 are opposite, so that a magnetic attractive force is generated between the two magnetic elements in an axial direction of a rotating shaft 200. Therefore, when the rotating shaft 200 deviates from an axis, the magnetic attractive force includes force which is applied to the second magnetic element 410 (indirectly applied to the rotating shaft 200) in the radial direction of the rotating shaft 200 along the axis thereof, thereby positioning the rotating shaft 200 on the axis. In another embodiment, alternatively, one of the first magnetic element and the second magnetic element may have a plate-shaped structure. This is not limited by the embodiment.

Furthermore, as illustrated in FIG. 2, based on the scheme that the second magnetic element 510 is of a plate-shaped structure, in the embodiment, an upper end of the rotating shaft 200 can horizontally extend to form a platform 220, and accordingly, the second magnetic element 510 is arranged on the platform 220. In another embodiment, the upper end of the rotating shaft can alternatively be equipped with a second magnetic element of a plate-shaped structure through another structure, for example, a groove. This is not limited in the embodiment.

Furthermore, as illustrated in FIG. 2, based on the scheme that the second magnetic element 520 has a plate-shaped structure, in the embodiment, a position, corresponding to the rotating shaft 200, on an outer surface of a top of the housing can be provided with a groove 122, and accordingly, the first magnetic element 520 is arranged in the groove 122. In another embodiment, a position, corresponding to the rotating shaft, on the outer surface of the top of the housing can alternatively be equipped with a first magnetic element of a plate-shaped structure in another manner. For example, the groove is not provided, and the first magnetic element is directly arranged on the outer surface of the housing. In addition, the first magnetic part may alternatively be arranged on an inner surface of a top of the housing or arranged in the groove provided on the inner surface on the top of the housing. This is not limited in the embodiment.

Furthermore, based on the scheme that the second magnetic element 510 has a plate-shaped structure, in the embodiment, the second magnetic element 510 may have a circular-disc-shaped structure, and an axis of the circular disc coincides with that of the rotating shaft 200.

Furthermore, based on the scheme that the first magnetic element 520 has a plate-shaped structure, in the embodiment, the first magnetic element 520 may have a circular-disc-shaped structure, and an axis of the circular disc coincides with that of the rotating shaft 200.

Furthermore, based on the scheme that both the second magnetic element 510 and the first magnetic element 520 have circular-disc-shaped structures respectively, in the embodiment, an orthographic projection of the second magnetic element 510 in a horizontal direction completely coincides with an orthographic projection of the first magnetic element 520 in the horizontal direction. That is, a diameter of a corresponding circle of a cross section of the second magnetic element 510 is equal to that of a corresponding circle of a cross section of the first magnetic element 520.

It should be noted that in another embodiment, the magnetic positioning assembly of the mounting bracket provided in the present disclosure may alternatively include a plurality of second magnetic elements or a plurality of first magnetic elements. For example, on the basis of the first embodiment illustrated in FIG. 1, the magnetic positioning assembly includes a plurality of second magnetic elements and one first magnetic element, where the plurality of second magnetic elements may be arranged at intervals along a circular path, and force in a radial direction of a rotating shaft is separately generated between the plurality of second magnetic elements and the first magnetic element. Alternatively, the magnetic positioning assembly includes a plurality of first magnetic elements and one second magnetic element, where the plurality of first magnetic elements may be arranged at intervals along a perimeter of a circle, and force in a radial direction of a rotating shaft is respectively generated between the plurality of first elements and the second magnetic element. Alternatively, the magnetic positioning assembly includes a plurality of second magnetic elements and a plurality of first magnetic elements, and force in a radial direction of the rotating shaft is respectively generated between the plurality of second elements and the plurality of first magnetic elements.

In addition, in another embodiment, the mounting bracket according to the present disclosure may alternatively include a plurality of magnetic positioning assemblies which may be vertically arranged at intervals in an axial direction of the rotating shaft. For example, in a case that there are two magnetic positioning assemblies, the two magnetic positioning assemblies may be respectively arranged between the upper end of the rotating shaft and the top of the housing and between the lower end of the rotating shaft and the bottom of the housing.

It should be noted herein that the mounting brackets described in the specification are merely several examples of various mounting brackets which can adopt the principle of the present disclosure. It should be clearly understood that the principle of the present disclosure is not only limited to any detail or any part of the mounting bracket illustrated in the accompanying drawings or described in the specification.

Based on the detailed descriptions of two exemplary embodiments of the mounting bracket provided in the present disclosure, one exemplary embodiment of a self-propelled robot provided in the present disclosure is briefly described below.

In the embodiment, the self-propelled robot according to the present disclosure includes a base body and a laser distance sensor, and further includes the mounting bracket according to the present disclosure and described in detail in the foregoing embodiments. Specifically, the base body may include a housing or another structure of the self-propelled robot, wherein the mounting bracket is mounted on the base body through the housing. Accordingly, the laser distance sensor is arranged on the rotating shaft of the mounting bracket, so that the laser distance sensor is mounted on the base body of the robot through the mounting bracket. In the embodiment of the present disclosure, the laser distance sensor may be mounted on a top of the self-propelled robot through the mounting bracket, and rotation of the laser distance sensor can be realized through rotation of the mounting bracket, so that the laser distance sensor measures a distance between the self-propelled robot and an obstacle nearby. In another embodiment of the present disclosure, the laser distance sensor may alternatively be mounted on a side surface of the self-propelled robot through the mounting bracket. This is not limited in the present disclosure.

It should be noted that the self-propelled robot illustrated in the accompanying drawings and described in the specification are merely an example of various robots which can adopt the principle of the present disclosure. It should be clearly understood that the principle of the present disclosure is not only limited to any detail or any part of the self-propelled robot illustrated in the accompanying drawings or described in the specification.

In summary, the magnetic positioning assembly of the mounting bracket disclosed in the embodiments of the present disclosure includes a second magnetic element and a first magnetic element, which are respectively arranged on the rotating shaft and the housing; and in a case that the rotating shaft deviates from an axis in the rotation process, force in the radial direction of the rotating shaft is generated between the second magnetic element and the first magnetic element. Through the scheme, in a case that the laser distance sensor is arranged on the rotating shaft of the mounting bracket according to the present disclosure, the mounting bracket can position the rotating shaft with respect to the housing through force in the radial direction of the rotating shaft, so that offset and jitter generated during rotation of the laser distance sensor can be effectively alleviated, thereby improving reliability and precision of products, prolonging service lives of the products, and the like.

Although the present disclosure has been described with reference to a few typical embodiments, it should be understood that the terms used herein are meant to be illustrative and not restrictive. Because the present disclosure can be implemented in various forms without departing from the spirit or gist of the present disclosure, it should be understood that the foregoing embodiments are not limited to any of the foregoing details, but should be broadly explained within the spirit and scope defined by the appended claims. Therefore, all changes and modifications that fall within the scope of the claims or equivalents thereof shall be covered by the appended claims.

What is claimed is:

1. A mounting bracket, configured to rotatably mount a laser distance sensor on a base body, and comprising:
    a housing, which is provided with an inner cavity;
    a rotating shaft, vertically arranged, and configured to rotate about an axis, in the inner cavity; and
    a magnetic positioning assembly, comprising a first magnetic element and a second magnetic element which are respectively attached to the housing and the rotating shaft;
    wherein the laser distance sensor is attached to the rotating shaft; and wherein the mounting bracket is configured to prevent the rotating shaft from deviating from the axis by generating a force between the first magnetic element and the second magnetic element in a radial direction of the rotating shaft.

2. The mounting bracket according to claim 1, wherein the first magnetic element is arranged at a position, corresponding to an upper end of the rotating shaft, of the housing, and the second magnetic element is arranged at the upper end of the rotating shaft.

3. The mounting bracket according to claim 1, wherein the first magnetic element is symmetrically arranged relative to the axis and the second magnetic element is symmetrically arranged relative to the axis.

4. The mounting bracket according to claim 2, wherein the first magnetic element is symmetrically arranged relative to the axis and the second magnetic element is symmetrically arranged relative to the axis.

5. The mounting bracket according to claim 4, wherein a polarity of the first magnetic element and a polarity of the second magnetic element are identical.

6. The mounting bracket according to claim 5, wherein the first magnetic element has an annular structure, an inner diameter of the first magnetic element is greater than an outer diameter of the second magnetic element, and the first magnetic element is arranged around the second magnetic element.

7. The mounting bracket according to claim 6, wherein an inner surface of a top of the housing is provided with a first bump that bumps downwards, and the first magnetic element is attached to the first bump.

8. The mounting bracket according to claim 6, wherein the second magnetic element has an annular structure, and an axis of the annular structure coincides with the axis.

9. The mounting bracket according to claim 8, wherein the upper end of the rotating shaft is provided with a second bump that bumps upwards, and the second magnetic element is arranged around the second bump.

10. The mounting bracket according to claim 4, wherein a polarity of the first magnetic element and a polarity of the second magnetic element are opposite.

11. The mounting bracket according to claim 10, wherein the first magnetic element has a plate-shaped structure.

12. The mounting bracket according to claim 11, wherein a position, corresponding to the rotating shaft, of an outer surface of a top of the housing is provided with a groove, and the first magnetic element is arranged in the groove.

13. The mounting bracket according to claim 11, wherein the second magnetic element has a plate-shaped structure.

14. The mounting bracket according to claim 13, wherein the upper end of the rotating shaft horizontally extends to form a platform, and the second magnetic element is attached to the platform.

15. The mounting bracket according to claim 1, wherein the housing comprises:
    a first case; and
    a second case, detachably arranged on the first case, wherein
    the first case and the second case are enclosed to define the inner cavity; and
    a lower end of the rotating shaft is rotatably arranged on the first case.

16. A self-propelled robot, comprising a base body and a laser distance sensor, and further comprising:
    a mounting bracket, configured to rotatably mount the laser distance sensor on the base body;
    wherein the mounting bracket comprises:
    a housing, which is provided with an inner cavity;
    a rotating shaft, vertically arranged, and configured to rotate about an axis, in the inner cavity; and
    a magnetic positioning assembly, comprising a first magnetic element and a second magnetic element which are respectively attached to the housing and the rotating shaft;
    wherein the laser distance sensor is attached to the rotating shaft; and wherein the mounting bracket is configured to prevent the rotating shaft from deviating from the axis by generating a force between the first magnetic element and the second magnetic element in a radial direction of the rotating shaft,
    wherein the mounting bracket is mounted on the base body via the housing.

17. The self-propelled robot according to claim 16, wherein the first magnetic element is arranged at a position, corresponding to an upper end of the rotating shaft, of the housing, and the second magnetic element is arranged at the upper end of the rotating shaft.

18. The self-propelled robot according to claim 16, wherein the mounting bracket is arranged on a top of the base body.

19. The self-propelled robot according to claim 16, wherein the base body comprises a housing, and the mounting bracket is arranged on the base body through the housing of the base body.

20. The self-propelled robot according to claim 16, wherein the robot is a cleaning robot.

* * * * *